Dec. 8, 1964     I. VACCARI ET AL     3,160,496
PROCESS FOR TREATING IRON PYRITES
Filed March 27, 1962
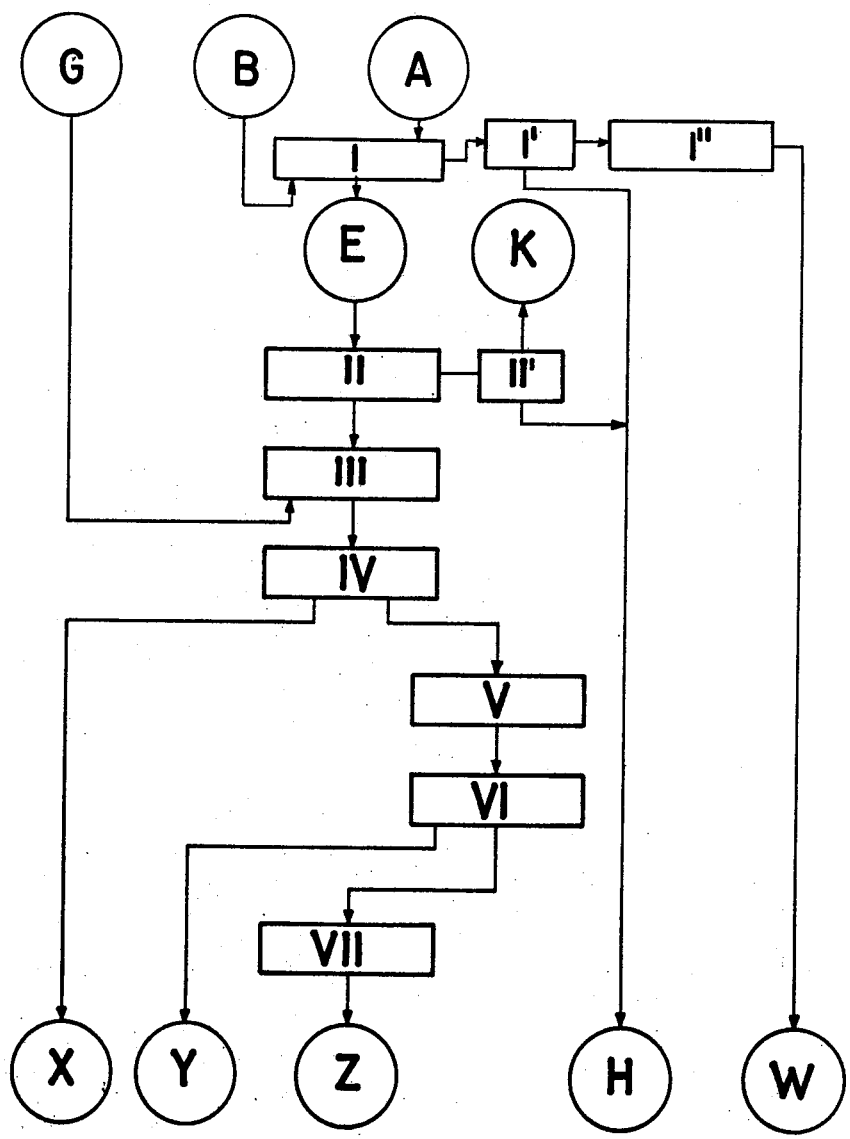
INVENTORS:
Italo Vaccari,
BY Pierluigi Salle,
Angelo Morra,
Umberto Colombo.

3,160,496
PROCESS FOR TREATING IRON PYRITES
Italo Vaccari, Pierluigi Salle, and Angelo Morra, Milan, and Umberto Colombo, Novara, Italy, assignors to Montecatini Società Generale per l'Industria Mineraria e Chimica, a corporation of Italy
Filed Mar. 27, 1962, Ser. No. 182,841
Claims priority, application Italy, Mar. 28, 1961, 5,549/61
11 Claims. (Cl. 75—1)

Several processes are known for the treatment of iron pyrites to obtain sulfur dioxide for use in the synthesis of sulfuric acid and pyrite cinders containing iron oxide for use in metallurgical processes to produce steel, pig iron and similar products. Generally, these processes contain the following steps:

(1) Enrichment of the pyrite crude by means of washing, levitation, flotation, sink-and-float or other methods.

(2) Roasting of the enriched ore in either Herreshoff type multi-hearth furnaces or in the more modern fluidized bed furnaces, which allow the recovery of a major portion of the heat developed in the exothermic reaction of the pyrite oxidation in the form of steam.

(3) Utilization of the cinders remaining after roasting in metallurgical processes.

When the quality of the crude is so poor as to make it economically unfeasible to enrich the ore as indicated above, the crude ore is roasted directly. In this case, it is apparent that the residual cinders of the roasting operation are of very low commercial value. In fact, they are generally mixed with cinders of higher iron titer, for use in iron metallurgy processes.

The crude pyrite ore is also roasted directly when the ore itself has a very high iron content so that a preliminary enrichment is unnecessary. Direct roasting has the advantage that the roasting operation may be carried out on ore which has not been finely ground, and thereby avoids the cost of grinding, which for pyrites is very high. In the pyrite roasting, a "decrepitation" phenomenon occurs to a greater or lesser extent, whereby the ore grains burst with a greatly decreased average diameter of the particles. When the roasting of the crude ore is carried out in a relatively slight oxidative medium, the iron in the pyrites oxidizes to magnetite (ferrous-ferric oxide, $Fe_3O_4$). The magnetite is readily separated from the remaining cinders by means of wet or dry magnetic separation. This method of oxidation, however, results in an incomplete utilization of the sulfur in the pyrites, whereby the $SO_2$ yield is low. Moreover, the iron recovered in the form of magnetite is not a very large percentage of the total iron contained in the pyrite ore.

Since magnetic enrichment is profitable in comparison to other methods of ore enrichment, we have attempted to find a process whereby the pyrite cinders could be magnetically enriched without substantially reducing the $SO_2$ roasting yield. When desulfuration has been carried out satisfactorily, the cinders consist primarly of hematite ($Fe_2O_3$). We therefore attempted to subject these cinders to reduction so as to obtain magnetite which could be readily separated from the inert material by the high magnetic susceptibility of the magnetite.

The process of magnetic reduction of hematite to magnetite in rotary furnaces or in fluidized bed furnaces' utilizing reducing gases produced by coke, naphtha, combustible oils or natural gases, is known. Reduction generally occurs at high temperatures. The process is relatively expensive and has not been used commercially with pyrite cinders because of the better convenience offered by the pyrite enrichment through washing, flotation, etc., before the roasting operation.

We have found that hematitic cinders, which are left after the pyrite roasting, may be reduced to magnetite without the operation of bringing the cinders to the reduction temperature. The process, which is an object of our invention, makes it possible to obtain cinders of $Fe_3O_4$, which may be readily magnetically separated from the inert material, while avoiding both the consumption of energy in order to bring the cinders up to reduction temperature, and the initial fine grinding of the crude pyrite, which is roasted in our process after having been ground in crushers with openings of about 10–12 mm.

It is apparent that the cinders removed magnetically are, owing to their high iron content, readily utilizable in metallurgical processes, either in bulk form or after pelletizing or sintering, for the production of high quality steels obtained by means, for example, of electric furnaces. The pyrite treatment process, according to our invention, is schematically illustrated in the drawing. The legends have the following meanings. A: pyrite; B: air; E: hot hematite cinders; G: reducing gas; H: steam; K: waste gas; W: $H_2SO_4$; X: inert material of greater diameter than 1 or 2 mm., to be discharged; Y: fine sterile material to be discharged; Z pelletized cinders with 60–70% Fe for the iron metallurgy; I: roasting in fluidized bed furnace; I': recovery of roasting heat; I'': catalytic oxidation of $SO_2$; II: magnetizing reduction; II': recovery of reduction heat; III: cooling of cinders; IV: optional sifting (1 or 2 mm.); V: grinding of the fines; VI: magnetic enrichment; and VII: pelletizing of rich cinders.

The pyrite crude, after a simple crushing, for instance to 10–12 mm., is roasted on a fluidized bed, thereby producing $SO_2$, steam, and cinders containing ferric oxide $Fe_2O_3$.

Since some of the pyrite crudes contain an inert portion made up predominantly of calcium carbonate, it is preferable, according to our process, to carry out the roasting in the fluidized bed furnace at a temperature above 800° C., i.e. between 800° and 1100° C., so as to shift the equilibrium of the oxidation reaction $SO_2$ to $SO_3$ to the left. Operating at high temperatures has the additional advantage of producing large quantities of steam. The cinders obtained from the bed and the cyclone of the fluidized bed have temperatures in the order of 800–1000° C. and 300–500° C., respectively These cinders are immediately introduced after having been optionally mixed with each other into reduction furnaces where the reduction is carried out by means of a reducing gas consisting of $H_2$ and CO, which are produced from coke or liquid or gaseous fuels, e.g. by the cracking of heavy fuel oil. Thus, it is only necessary to use fuel to produce the reducing gas and unnecessary to add additional fuel to bring the hematite to reduction temperature. This contrary to the treatment of hematite ore reduction.

The reduction furnace may either be of the rotative or fluidized bed type. The high specific surface of the pyrite cinders confers to these cinders, in comparison to the natural hematite, a much greater reactivity, whereby the reduction to magnetite in a rotative furnace takes place in about 20 to 30 minutes, instead of the conventional 1 to 2 hours for the natural hematite. In fluidized bed furnaces with one or more stages, the reduction of the cinders takes place within a much shorter time, that is, in the order of fractions of a minute. Moreover, it is possible to recover a certain amount of heat in the form of steam by heat exchange of the discharge gases produced by the reduction.

The reduced cinders are cooled, ground and subjected to magnetic enrichment, whereby they are further ground in order to obtain pellets of high iron content. The cooling may be carried out either with the exclusion of air or within the contact of air. In the former case, re-oxidation of the magnetite is avoided, whereas in the latter case, the cooling is carried out under such conditions as to promote the formation of magnetic gamma-hematite by reoxidation of the magnetite. To achieve this purpose, the temperature of the cinders is kept at about 200–250° C. for at least 5 minutes. Another possibility according to our invention is that of separating, after the reduction, the coarser cinder fraction. This fraction is generally constituted of inert material with a very low iron content. A greater portion of inert material is discarded by this sifting operation, thereby reducing the cost of both grinding and magnetic enrichment steps.

In summary, the process of our invention offers the following advantages:

(1) It permits the pyrite crude to be roasted, without a previous enrichment, while starting with ores having from about 18–20% sulfur, to about pure pyrite.

(2) It greatly reduces ore grinding operations and takes advantage of the diameter decrease by the pyrite decrepitation in the roasting step.

(3) It utilizes the hot cinders leaving the roasting furnace, without additional heat consumption, in the magnetic reduction. That is, the cinders to be subjected to reduction need no preheating: the temperature of these cinders leaving the roasting plant has the value required for the fluid bed reduction reaction, namely 600 to 650° C.

(4) It makes possible the use of fluidized beds with very short contact times between cinders and reducing gases (thanks to the high porosity, namely elevated specific surface area, of the hematitic cinders).

(5) It permits complete recovery in the reduction step on account of additional combustion of the discharge gas of said reduction step.

(6) It also permits the possibility of separating by means of a simple sifting operation, a majority of the inert material after the magnetizing reduction, thereby simplifying the subsequent grinding and magnetic treatment steps.

(7) It results in magnetic cinders having very high iron content (over 63% Fe), which can be readily pelletized and utilized for the production of high quality steels in electric furnaces.

Further advantages will appear from the following description.

The invention will be further described with reference to the following examples, which are given by way of illustration only and not by way of limitation.

EXAMPLE 1

100 metric tons of pyrite crude ore, originating from a mine in Maremma, were used. The chemical composition of the ore in percentages was:

| | |
|---|---:|
| Total iron | 35.11 |
| Sulfide sulfur | 35.92 |
| Sulfate sulfur | 0.56 |
| Total sulfur | 36.48 |
| $SiO_2$ | 10.34 |
| $Al_2O_3$ | 1.52 |
| CaO | 6.86 |
| MgO | 0.52 |
| $CO_2$ | 4.65 |
| Other | 4.52 |

The ore was subjected to a crushing operation by means of a jaw crusher in series with a Symons conical head crusher with a 10 mm. opening. The crushed ore showed the following granulometry.

| Diameter (mm.): | Percent by weight |
|---|---:|
| 3.70–10 | 24.0 |
| 1.38–3.70 | 25.6 |
| 0.71–1.38 | 17.8 |
| 0.45–0.71 | 10.1 |
| 0.20–0.45 | 9.9 |
| 0.10–0.20 | 6.6 |
| 0.05–0.10 | 3.7 |
| <0.05 | 2.3 |

The crushed pyrites were fed into a fluidized bed furnace ("Fluo Solids" furnace) having an inner diameter of 3 m. and a height of 6 m. and provided with a boiler, cyclone and filter for dust collection. Along with the pyrites, air was fed in 5–10% excess of the stoichiometric proportions of the oxidation of pyrite to hematite, to the furnace:

$$4\ FeS_2 + 11\ O_2 \rightarrow 8\ SO_2 + 2\ Fe_2O_3$$

The feeding was carried out continuously, so that the entire 100 metric tons of ore were roasted within a period of 24 hours. The temperature of the central portion of the furnace was about 850–900° C. From the boiler, steam was recovered at 400° C. and 35 atm, in the proportion of 930 kg. per 1000 kg. of roasted pyrites. The gas obtained from the filter discharge contained $SO_2$ for use in sulfuric acid synthesis. About 638 kg. of $SO_2$ were produced per each metric ton of roasted pyrites. The $SO_2$ concentration of a discharge gas was in the order of 10–11% by volume. The cinders recovered from the bed, the boiler, the cyclone and the filter of the fluidized bed furnace had the following characteristics:

| Cinders recovered from— | Amount (kg.) per ton unsorted pyrite | Temperature, ° C. | Percent Fe | Percent S as sulfide |
|---|---:|---:|---:|---:|
| Bed | 395 | 850 | 36.87 | 0.72 |
| Boiler | 211 | 420 | 52.23 | 0.82 |
| Cyclone | 126 | 390 | 51.93 | 0.89 |
| Filter | 38 | 180 | 51.40 | 0.93 |

The hot cinders were immediately mixed and conveyed to a second fluidized bed furnace having an inner diameter of 2.2 m. and height of 4.5 m. adjacent to the roasting furnace. These cinders had the following granulometry.

| Diameter (mm): | Percent by weight |
|---|---:|
| 3.70–10.0 | -- |
| 1.38–3.70 | 14.1 |
| 0.71–1.38 | 11.6 |
| 0.45–0.71 | 12.5 |
| 0.20–0.45 | 9.0 |
| 0.10–0.20 | 23.9 |
| 0.05–0.10 | 24.3 |
| <0.05 | 4.6 |

A reducing gas, obtained by the partial combustion of Bunker C oil, was fed to the reduction furnace. The reducing gas, whose temperature at the furnace inlet is about 1000° C., had the following composition:

| | Percent |
|---|---:|
| $N_2$ | 65.8 |
| $H_2$ | 13.5 |
| CO | 15.4 |
| $CO_2$ | 5.2 |
| $CH_4$ | Traces |
| $O_2$ | Traces |

The average temperature of the cinders fed to the furnace was about 520–550° C. The reduction furnace output was about 3200 kg./hr. The average temperature in the interior of the furnace was between 600 and 650° C. The cinders obtained from the bed, the cyclone and the filter of the reduction furnace were combined, cooled with exclusion of air, subjected to grinding and magnetic enrichment with dry separators. Two fractions were so obtained, one magnetic and one non-magnetic. The characteristics of these fractions were as follows:

|  | Amount in kg. based on 1 ton of pyrite crude | Fe percent | S percent as sulfide |
|---|---|---|---|
| Magnetic fraction | 497 | 65.4 | 0.30 |
| Non-magnetic fraction | 253 | 6.4 | 1.95 |

The magnetic fraction was finally ground and subjected to pelletization. The pellets obtained thereby had an iron content of 65.2% Fe and contained a residue of 0.02% sulfur as sulfide. 92.57% of the iron present in the pyrite ore was recovered in this example.

EXAMPLE 2

2 metric tons of pyrite crudes originating from a mine in Maremma were utilized in this example. The chemical composition and the granulometric distribution of the ore, after crushing, were as follows.

(a) Granulometry

Diameter (mm):             Percent by weight
- 4.00–8.00 _____ 18.5
- 1.38–4.00 _____ 20.4
- 0.71–1.38 _____ 14.3
- 0.45–0.71 _____ 10.1
- 0.20–0.45 _____ 13.3
- 0.10–0.20 _____ 14.0
- 0.05–0.10 _____ 5.2
- <0.05 _____ 4.2

(b) Chemical Analysis

Percent
- Iron _____ 36.51
- S (sulfide) _____ 38.57
- S (sulfate) _____ 0.34
- $SiO_2$ _____ 6.83
- $Al_2O_3$ _____ 1.99
- CaO _____ 5.07
- MgO _____ 0.54
- $CO_2$ _____ 3.92
- Other _____ 6.23

The ore was fed to a furnace with a fluidized bed having a diameter of 0.6 m. and a height of 3.5 m. The furnace was provided with a cyclone and had a capacity of 100 kg./hour of ore. The roasting was carried out with a slight excess of air to that stoichiometrically required. The furnace temperature was maintained at about 900–950° C. The cinders were recovered from the bed and the cyclone of the furnace. The $SO_2$-containing gases were conveyed to the $H_2SO_4$ synthesis plant. The bed cinders were collected at 860–870° C., those of the cylone at 350° C. The temperature of the cinders, after uniting, was about 530° C. The cinders were continuously introduced into a rotative reduction furnace having a length of 6.5 m. and an inner diameter of 0.45 m. At the same time a measured amount of powdered coke having a size up to 3 mm. and corresponding to 3% by weight of cinders was introduced into the furnace. From the opposite end of the furnace, air was introduced in such proportions as to produce, by combustion of the coke, a reducing gas containing about 30–35% $CO+H_2$. As a consequence of the consequence of the controlled combustion, the furnace temperature, in the central zone, was about 900° C. The cinders remained in the reduction furnace for an average of about 40 minutes. The over-all output of the furnace was adjusted so as to absorb, within 24 hours, the entire amount of cinders recovered from pyrite combustion (about 1500 kg.).

The reduced cinders were quenched with water and sifted on a sieve of 1.38 mm. Two fractions were obtained, of which the coarse fraction, which is about 12.1% by weight of the cinder mass and contains 16.2% iron, is discarded.

The fine fraction, which is equal to 87.9% by weight of the cinder mass and contains 50.3% iron, is ground to 0.2 mm. and subjected to wet magnetic enrichment. Two fractions were obtained thereby. These fractions which were respectively magnetic and non-magnetic had the following characteristics:

|  | Amount in kg. based on 1 ton of pyrite crude | Fe percent | S percent as sulfide |
|---|---|---|---|
| Magnetic fraction | 480 | 66.8 | 0.26 |
| Non-magnetic fraction | 178 | 8.0 | 1.25 |

88.0% of the iron contained in the pyrite crude was recovered in this example. The cinders recovered gave pellets of very fine quality.

Obviously, many modifications and variations of the present invention are possible in the light of the above teachings. For instance, the artificial magnetite produced in fluid bed units being obtained as two distinct fractions, the coarser fraction, coming from the bed of the reactor, can be separated dry, while the fine material, from the cyclones, is separated wet. The concentrate resulting from the mixing of these two fractions, contains then just about the right amount of water for the forming of "green" pellets. The baked pellets obtained in a grid plant from such material have a very high degree of reducibility, thanks to their high permeability (high specific surface area). Hence they are first quality feed to sponge iron manufacture. It is therefore to be understood that within the scope of the appended claims, the invention may be practiced otherwise than as specifically described herein.

We claim:

1. A process for obtaining $SO_2$, steam and cinders of high iron content, which comprises treating pyrite ore having a sulfur content above 18% by:
   (a) crushing the crude unsorted ore to less than 12 mm.;
   (b) roasting the crushed ore in a fluidized bed furnace thereby producing sulfur dioxide, hot hematite cinders, and steam;
   (c) reducing the hematite cinders of step (b), while still hot, in a reduction furnace by means of a reducing gas containing hydrogen and carbon monoxide, to magnetite cinders;
   (d) cooling the magnetite cinders produced in step (c); and
   (e) magnetically enriching the magnetite cinders.

2. A process for obtaining $SO_2$, steam and cinders of high iron content, which comprises treating pyrite ore having a sulfur content above 18% by:
   (a) crushing the crude unsorted ore to less than 12 mm.;
   (b) roasting the crushed ore in a fluidized bed furnace thereby producing sulfur dioxide, hot hematite cinders, and steam;
   (c) reducing the hematite cinders of step (b), while still hot, in a reduction furnace by means of a reducing gas containing hydrogen and carbon monoxide, to magnetite cinders;
(d) cooling the magnetite cinders produced in step (c);
(e) coarsely sifting the cooled cinders to remove an inert fraction; and
(f) magnetically enriching the magnetite cinders.

3. A process for obtaining $SO_2$, steam and cinders of high iron content, which comprises treating pyrite ore having a sulfur content above 18% by:
(a) crushing the crude unsorted ore to less than 12 mm.;
(b) roasting the crushed ore in a fluidized bed furnace at a temperature between about 800° and 1100° C., thereby producing sulfur dioxide, hot hematite cinders and steam;
(c) reducing the hematite cinders of step (b), while still hot, in a reduction furnace by means of a reducing gas containing hydrogen and carbon monoxide, to magnetite cinders;
(d) cooling the magnetite cinders produced in step (c); and
(e) magnetically enriching the reduced cinders.

4. A process for obtaining $SO_2$, steam and cinders of high iron content, which comprises treating pyrite ore having a sulfur content above 18% by:
(a) crushing the crude unsorted ore to less than 12 mm.;
(b) roasting the crushed ore in a fluidized bed furnace thereby producing sulfur dioxide, hot hematite cinders, and steam;
(c) reducing the hematite cinders of step (b), while still hot, in a reduction furnace maintained between 500° and 1000° C. by means of a reducing gas containing hydrogen and carbon monoxide, to magnetite cinders;
(d) cooling the magnetite cinders produced in step (c); and
(e) magnetically enriching the reduced cinders.

5. A process for obtaining $SO_2$, steam and cinders of high iron content, which comprises treating pyrite ore having a sulfur content above 18% by:
(a) crushing the crude unsorted ore to less than 12 mm.;
(b) roasting the crushed ore in a fluidized bed furnace thereby producing sulfur dioxide, hot hematite cinders, and steam;
(c) reducing the hematite cinders of step (b), while still hot, in a rotative reduction furnace maintained between 700° and 1000° C. by means of a reducing gas, to magnetite cinders;
(d) cooling the magnetite cinders produced in step (c); and
(e) magnetically enriching the reduced cinders.

6. A process for obtaining $SO_2$, steam and cinders of high iron content, which comprises treating pyrite ore having a sulfur content above 18% by:
(a) crushing the crude unsorted ore to less than 12 mm.;
(b) roasting the crushed ore in a fluidized bed furnace thereby producing sulfur dioxide, hot hematite cinders, and steam
(c) reducing the hematite cinders of step (b), while still hot, in a fluidized bed furnace maintained at temperatures between 500° and 900° C. by means of a reducing gas, to magnetite cinders;
(d) cooling the magnetite cinders produced in step (c); and
(e) magnetically enriching the magnetite cinders.

7. A process for obtaining $SO_2$, steam and cinders of high iron content, which comprises treating pyrite ore having a sulfur content above 18% by:
(a) crushing the crude unsorted ore or less than 12 mm.;
(b) roasting the crushed ore in a fluidized bed furnace thereby producing sulfur dioxide, hot hematite cinders, and steam;
(c) reducing the hematite cinders of step (b), while still hot, in a reduction furnace by means of a reducing gas containing hydrogen and carbon monoxide, to magnetite cinders;
(d) cooling the magnetite cinders produced in step (c);
(e) magnetically enriching the reduced cinders; and
(f) burning the reduction discharge gas from step (c) to recover the heat content thereof.

8. A process for obtaining $SO_2$, steam and cinders of high iron content, which comprises treating pyrite ore having a sulfur content above 18% by:
(a) crushing the crude unsorted ore to less than 12 mm.;
(b) roasting the crushed ore in a fluidized bed furnace thereby producing sulfur dioxide, hot hematite cinders, and steam;
(c) reducing the hematite cinders of step (b), while still hot, in a reduction furnace by means of a reducing gas containing hydrogen and carbon monoxide, to magnetite cinders;
(d) cooling the magnetite cinders of step (c) out of contact with air to prevent reoxidation of the magnetite; and
(e) magnetically enriching the magnetite cinders.

9. A process for obtaining $SO_2$, steam and cinders of high iron content, which comprises treating pyrite ore having a sulfur content above 18% by:
(a) crushing the crude unsorted ore to less than 12 mm.;
(b) roasting the crushed ore in a fluidized bed furnace thereby producing sulfur dioxide, hot hematite cinders, and steam;
(c) reducing the hematite cinders of step (b), while still hot, in a reduction furnace by means of a reducing gas containing hydrogen and carbon monoxide, to magnetite cinders;
(d) cooling the magnetite cinders of step (c) in contact with air while maintaining the cinder temperature at 200° to 250° C. for at least five minutes thereby producing magnetic gamma-hematite; and
(e) magnetically enriching the reduced and reoxidized cinders.

10. A process for obtaining $SO_2$, steam and cinders of high iron content, which comprises treating pyrite ore having a sulfur content above 18% by:
(a) crushing the crude unsorted ore to less than 12 mm.;
(b) roasting the crushed ore in a fluidized bed furnace thereby producing sulfur dioxide, hot hematite cinders, and steam;
(c) reducing the hematite cinders of step (b), while still hot, in a reduction furnace by means of a reducing gas containing hydrogen and carbon monoxide, to magnetite cinders;
(d) cooling the magnetite cinders produced in step (c);
(e) coarsely sifting the cooled cinders to remove an inert fraction;
(f) grinding the remaining cinders to a size between 0.05 and 0.2 mm. in wet mills; and
(g) magnetically separating the reduced cinders.

11. A process for obtaining $SO_2$, steam and cinders of high iron content, which comprises treating pyrite ore having a sulfur content above 18% by:
(a) crushing the crude unsorted ore to less than 12 mm.;
(b) roasting the crushed ore in a fluidized bed furnace thereby producing sulfur dioxide, hot hematite cinders, and steam;
(c) reducing the hematite cinders of step (b), while still hot, in a reduction furnace by means of a reducing gas containing hydrogen and carbon monoxide, to magnetite cinders;

(d) cooling the magnetite cinders produced in step (c);
(e) coarsely sifting the cooled cinders to remove an inert fraction;
(f) grinding the remaining cinders to a size between 0.1 and 0.2 mm. in dry mills, and
(g) magnetically separating the reduced cinders.

References Cited in the file of this patent

UNITED STATES PATENTS

| | | |
|---|---|---|
| 2,292,305 | Thomsen | Aug. 4, 1942 |
| 2,699,388 | Frick et al. | Jan. 11, 1955 |
| 2,943,929 | Norman | July 5, 1960 |
| 2,993,778 | Johannsen et al. | July 25, 1961 |
| 3,005,699 | Erck et al. | Oct. 24, 1961 |

FOREIGN PATENTS

| | | |
|---|---|---|
| 384,464 | Great Britain | Dec. 8, 1932 |